Patented Nov. 26, 1940

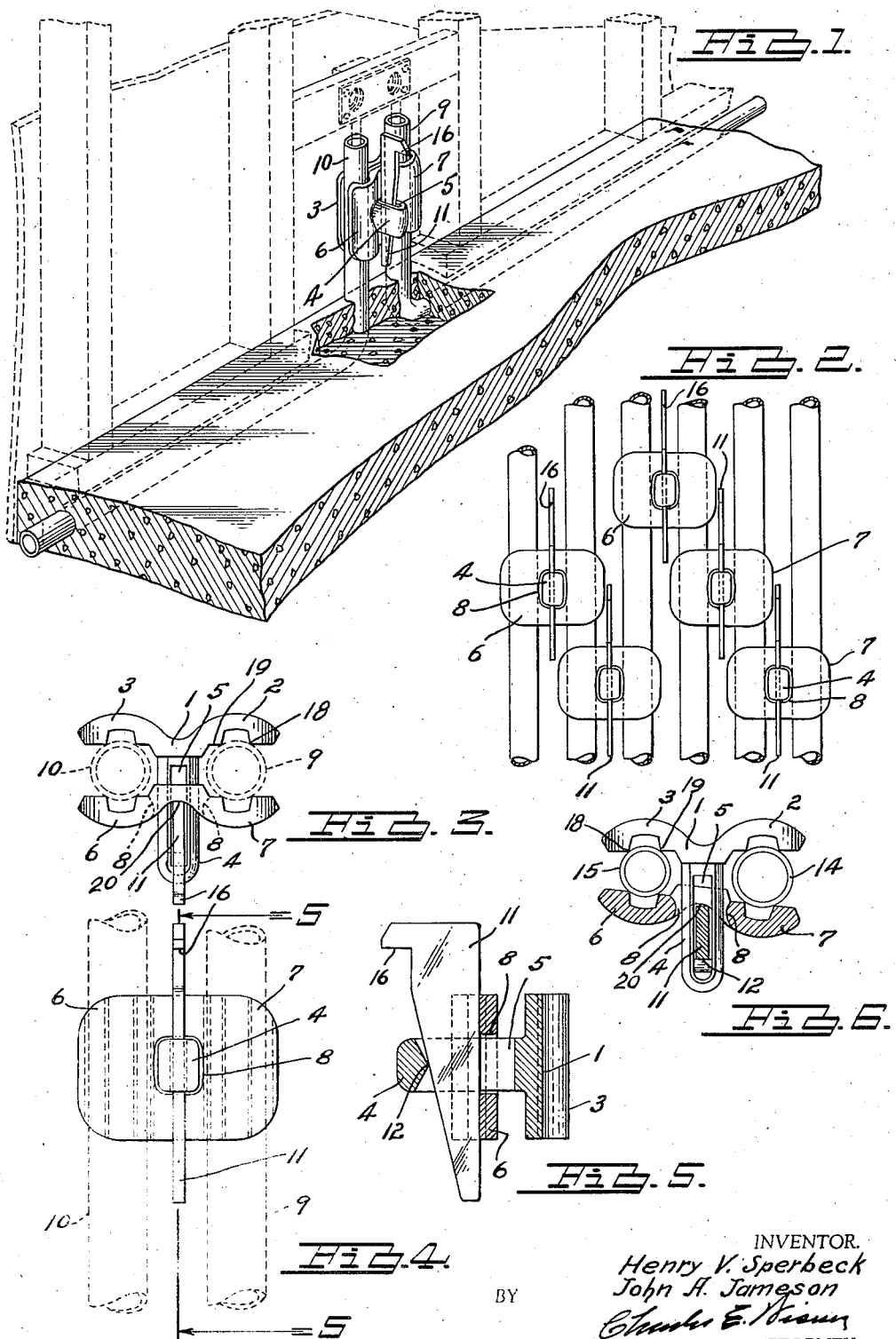

2,223,191

UNITED STATES PATENT OFFICE 2,223,191

CONDUIT CLAMP

Henry V. Sperbeck and John A. Jameson,
Ann Arbor, Mich.

Application November 25, 1938, Serial No. 242,258

5 Claims. (Cl. 24—243)

This invention relates to conduit clamps and the object of the invention is to provide a clamp for holding adjacent ends of conduits while the conduits are being embedded in concrete, such as in a floor or the like.

One of the particular objects of the invention is to provide a clamp for holding the conduit ends firmly in position so that they cannot be readily displaced during pouring of a concrete floor or wall in which the conduits are being embedded.

Another object of the invention is to provide a clamp which may be utilized to hold conduits of the same size or of different sizes and which will hold the same by a wedging action which draws the clamp members together.

A further object of the invention is to provide a conduit clamp comprising two clamp members, one clamp member being relatively stationary and provided with an extension having a slot therethrough and the other clamp member being relatively movable and provided with an aperture fitting over said extension and a wedge being inserted through the slot to urge the relatively movable clamp member toward the relatively stationary clamp member.

Another object of the invention is to provide an extension or stem on the stationary clamp member having a slot therethrough and the slot having a high point at the center against which the wedge engages in moving the movable clamp member toward the stationary clamp member A further object of the invention is to provide the movable clamp member with an enlarged aperture for the extension or stem whereby the movable clamp member may rock in relation to the stationary clamp member to accommodate itself to different sized conduits when urged to clamping position by the wedge.

These objects and the several novel features of the invention are hereinafter more fully described and claimed and the preferred form of construction by which these objects are attained is shown in the acompanying drawing in which—

Fig. 1 is a perspective view partly broken away showing conduits embedded in a concrete floor and the extending ends of the conduit held in position by the conduit clamp.

Fig. 2 is a view showing the clamp applied to hold a series of conduits in position.

Fig. 3 is an end view of the clamp showing the conduits in dotted lines.

Fig. 4 is a plan view of the clamp showing the conduits in dotted lines.

Fig. 5 is a section taken on line 5—5 of Fig. 4.

Fig. 6 is a section through the wedge and movable clamp member showing the clamp applied to different sized conduits.

In pouring a concrete floor or wall in which electrical conduits are to be embedded, the conduits are usually first mounted in position with the ends thereof extending above the level of the floor to be poured. These conduits are set in position and are usually provided with no means for holding the extending ends in a fixed position. The result is that the conduit ends may be knocked or pushed out of position in pouring the concrete and when the concrete has once set it is impossible to reposition the conduits.

In this invention the object is to provide a device which will hold the conduit ends in position while the concrete is being poured and the clamp is left on the conduit ends until the concrete has set, at which time, the clamp may be removed and the conduit ends will remain in the desired position. The clamp itself comprises a relatively stationary clamp member 1 shown more particularly in Figs. 3, 5 and 6 and this stationary clamp member 1 is provided with conduit engaging jaws 2 and 3. The clamp member 1 is provided with an outwardly extending stem 4 shown in Figs. 3, 4, 5 and 6 and this stem 4 is provided with a slot 5 therethrough as shown. The movable clamp member includes a pair of clamp jaws 6 and 7 connected together by a central portion formed to provide a central transverse channel 20 in its outer face. This central portion is provided with an enlarged aperture 8 havng rounded edges as shown in Fig. 6 to fit over the stem 4. When the movable jaw is fitted over the stem 4, the conduits 9 and 10 are engaged between the stationary and movable jaws as shown in Figs. 1 and 3. At this time the wedge 11 is inserted through the slot 5 in the stem 4 and this stem is provided with a high or V shaped point 12 at the top of the slot 5 and extending thereinto centrally between the sides of the stem which is engaged by the face of the wedge and as the wedge is driven through the slot 5 as shown in Fig. 5 it will move the movable jaw toward the stationary jaw to clamp the conduits therebetween. By providing the high point 12, the wedge will accommodate itself in fitting the movable jaw to the conduits and the pressure on the movable jaw is applied radially from the high point 12 through the wedge 11.

By providing the enlarged aperture 8 in the movable clamp member and rounding the edges thereof, the movable clamp member may accommodate itself to different sizes of conduits 14 and 15 as shown in Fig. 6 without finding at any point and the wedge action is the same in Fig. 6 as that shown in Figs. 3, 4 and 5.

In use, the conduits are positioned as desired and the clamp is applied to the extending ends of the conduits as shown in Fig. 1. At this time the concrete may be poured to embed the conduits and the clamp will hold the conduit ends firmly in position until the concrete has set. After the concrete has set, a hammer may be utilized to drive upwardly against the lug 16 on the wedge to disengage the wedge, at which time, the clamp may be removed from the conduits and the conduits will remain in position due to the fact that they are embedded in the set concrete. It is also possible to tie a series of conduits together as shown in Fig. 2 by providing a clamp for clamping each conduit to the next adjacent conduit. This arrangement allows a series of conduits to be brought out at a given point and held in position while the concrete is being poured and until the concrete has set.

By the arrangement shown in Fig. 5, the movable clamp member will have a universal rocking action in accommodating itself in position and by means of the high point 12 the pressure may be applied to the movable clamp member radially from the point 12 through the wedge 11.

The pressure applied by the member 11 is thus at all times a straight pull on the member 1. It is also pointed out that the parallel opposed jaws each have similar sharp parallel edges 18 and 19 to securely hold the conduits and tend to maintain them from lateral displacement and whether the conduits 9 and 10 of Fig. 3 be of the same diameter or of different diameters as indicated by the conduits 14 and 15 in Fig. 6, the rocking motion of one of the plates relative to the other does not displace the conduits from their proper center line spacing.

While the clamp has been described for use in connection with conduits for electrical wiring, it will operate with equal efficiency on water pipes, gas pipes, or other types of conduits.

From the foregoing description it becomes evident that the device is very simple and efficient in operation, is universal in action, will formly wedge the clamp jaws together on the conduits and provides a device which accomplishes the objects described.

Having thus fully described our invention, its utility and mode of operation, what we claim and desire to secure by Letters Patent of the United States is—

1. In a conduit clamp, a stationary clamp member having a pair of clamp jaws, a stem extending from the stationary clamp member between the clamp jaws and provided with a longitudinal slot, a movable clamp member having a pair of clamp jaws cooperating with the clamp jaws of the stationary clamp members, the movable clamp member being provided with a central transverse channel in its outer face and an aperture between the clamp jaws through which the stem extends, the aperture being considerably larger than the stem to allow rocking movement of the movable clamp on the stem, a wedge insertable through the slot in the stem and arranged to move the movable clamp toward the stationary clamp, the metal of the stem being formed to provide a V shaped point at the outer end of the slot intermediate the sides of the stem and against which one side of the wedge engages as it is moved into the slot with the other side of the wedge in engagement with the bottom of the transverse channel of the movable clamp member.

2. In a conduit clamp, a stationary clamp member having a stem, a movable clamp member fitting over the stem and movable toward the stationary clamp member each of said clamp members having a pair of conduit engaging jaws between which the stem extends, the stem being provided with a slot and the metal of the stem at the outer end of the slot being provided with a high point extending into the slot, a wedge insertable through the slot with one of its sides engaging against the high point and the other of its sides engaging the movable clamp member, the insertion of the wedge through the slot moving the movable clamp member toward the stationary clamp member and the pressure applied to the movable clamp member being on radial lines from said high point through the wedge.

3. In a conduit clamp, a stationary clamp member having a stem, a movable clamp member fitting over the stem of the stationary clamp member, the movable clamp member having a large aperture for the stem permitting the same to rock on the stem in all directions, the stem being provided with a longitudinal slot and the movable clamp member having a transverse channel in its outer face lying in a plane at a right angle to the plane occupied by the slotted stem, and a wedge inserted in the slot and engaging in the said channel to move the movable clamp member toward the stationary clamp member as the wedge is moved through the slot.

4. In a conduit clamp, a stationary clamp member, a stem extending from the stationary clamp member, a movable clamp member fitting over the stem, the stem being provided with a slot and the movable clamp member having a transverse channel in its outer face occupying a plane at a right angle to the plane occupied by the slotted stem, and a wedge insertable through the longitudinal slot to engage in the channel to move the movable clamp member toward the stationary clamp member, the slot being provided with a V shaped point at the center against which the angular face of the wedge engages.

5. A conduit clamp comprising a relatively stationary clamp member having a stem, a relatively movable clamp member having an aperture larger in cross section than the cross section of the stem through which the stem projects permitting the said member to rock on the stem, said movable clamp member having a transverse channel in its outer face and the stem having a slot, the outer end of which has a high point extending into the slot, a wedge insertable through the slot and engaging on one side against the point and the opposite side engaging in said transverse channel in the movable clamp, and providing a construction permitting the wedge to rock on the said point and the movable member to rock on an axis substantially parallel with the wedge and adapting the same to engage a pair of conduits of different diameters on the opposite sides of the wedge.

HENRY V. SPERBECK.
JOHN A. JAMESON.